United States Patent
Shimada et al.

(10) Patent No.: US 11,862,121 B2
(45) Date of Patent: Jan. 2, 2024

(54) LIQUID CRYSTAL APPARATUS AND PROJECTION-TYPE DISPLAY APPARATUS

(71) Applicant: SEIKO EPSON CORPORATION, Tokyo (JP)

(72) Inventors: Ken Shimada, Chitose (JP); Hiroyuki Oikawa, Chitose (JP); Kiyoshi Hara, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 120 days.

(21) Appl. No.: 17/876,475

(22) Filed: Jul. 28, 2022

(65) Prior Publication Data

US 2023/0029855 A1   Feb. 2, 2023

(30) Foreign Application Priority Data

Jul. 29, 2021   (JP) .................. 2021-124151

(51) Int. Cl.
   *G09G 3/36*     (2006.01)
   *G02F 1/1343*   (2006.01)
   *G03B 21/00*    (2006.01)

(52) U.S. Cl.
   CPC ..... *G09G 3/3614* (2013.01); *G02F 1/134309* (2013.01); *G03B 21/006* (2013.01); *G09G 2310/06* (2013.01); *G09G 2320/046* (2013.01)

(58) Field of Classification Search
   CPC ................. G09G 3/3614; G02F 1/134309
   See application file for complete search history.

(56) References Cited

U.S. PATENT DOCUMENTS

| | | | |
|---|---|---|---|
| 2008/0055529 A1 | 3/2008 | Shirasaka et al. | |
| 2016/0216494 A1* | 7/2016 | Shiokawa | G02B 13/16 |
| 2020/0026131 A1* | 1/2020 | Tomikawa | G02F 1/13306 |
| 2021/0202680 A1* | 7/2021 | Shin | H01L 27/3276 |

FOREIGN PATENT DOCUMENTS

JP    2008-058497    3/2008

* cited by examiner

*Primary Examiner* — Sanghyuk Park
(74) *Attorney, Agent, or Firm* — JCIPRNET

(57) ABSTRACT

A liquid crystal apparatus includes a liquid crystal layer, a pixel electrode provided in a display region and configured to be supplied with an image signal at a first frequency, and a first electrode provided in a region outside the display region and configured to be alternately supplied with a positive polarity potential with a potential higher than a predetermined potential and a negative polarity potential with a potential lower than the predetermined potential at a second frequency lower than the first frequency such that a positive polarity period in which the positive polarity potential is supplied and a negative polarity period in which the negative polarity potential is supplied have a same length.

10 Claims, 8 Drawing Sheets

LIQUID CRYSTAL APPARATUS AND PROJECTION-TYPE DISPLAY APPARATUS

The present application is based on, and claims priority from JP Application Serial Number 2021-124151, filed Jul. 29, 2021, the disclosure of which is hereby incorporated by reference herein in its entirety.

BACKGROUND

1. Technical Field

The present disclosure relates to a liquid crystal apparatus and an electronic apparatus including the liquid crystal apparatus.

2. Related Art

In the related art, as disclosed in JP-A-2008-58497, degradation of the display characteristics of a liquid crystal panel in a liquid crystal apparatus due to ionic impurities eluted from a sealing material surrounding the liquid crystal layer or mixed during liquid crystal injection, and thereafter diffused and/or aggregated in the display region during driving of the liquid crystal apparatus is known.

In JP-A-2008-58497, to suppress the above-described degradation of the display characteristics, a plurality of peripheral electrodes are disposed in a peripheral region between a sealing material and a display region, and different potentials are applied to electrodes adjacent to each other in the plurality of peripheral electrodes.

Then, by periodically switching the potential at the same 120 Hz as the driving frequency of the pixel electrode or at a frequency higher than 120 Hz, the ionic impurities are continuously moved out of the display region without stopping the flow of ionic impurities in the peripheral region.

For example, when viewing an image displayed by a liquid crystal apparatus in a bright area, such as a sales floor in a shopping center, if the displayed image is dark, the image will be difficult to see.

In view of this, in recent years, for a light source combined with a liquid crystal apparatus, a liquid crystal apparatus that can display bright images by using a high-luminance light source such as a laser light source has been developed.

When a high-luminance light source such as a laser light source is used, however, blemish tends to be easily generated in the display region of the liquid crystal apparatus used, while bright images can be displayed.

SUMMARY

A liquid crystal apparatus of the present application includes a liquid crystal layer, a pixel electrode provided in a display region and configured to be supplied with an image signal at a first frequency, and a first electrode provided in a region outside the display region and configured to be alternately supplied with a positive polarity potential with a potential higher than a predetermined potential and a negative polarity potential with a potential lower than the predetermined potential at a second frequency lower than the first frequency such that a positive polarity period in which the positive polarity potential is supplied and a negative polarity period in which the negative polarity potential is supplied have a same length.

An electronic apparatus includes the above-described liquid crystal apparatus.

An electronic apparatus of the present application includes a light source with an output light flux of 5000 lumen to 20000 lumen, a light splitting member configured to split light from the light source, the liquid crystal apparatus according to claim 1 configured to modulate first light split by the light splitting member, and a second liquid crystal apparatus configured to modulate second light split by the light splitting member. The second liquid crystal apparatus includes a liquid crystal layer, a pixel electrode provided in a display region of the second liquid crystal apparatus and configured to be supplied with an image signal at a first frequency, and a first electrode provided in a region outside the display region and configured to be alternately supplied with a positive polarity potential with a potential higher than a predetermined potential and a negative polarity potential with a potential lower than the predetermined potential at a third frequency lower than the first frequency such that a positive polarity period in which the positive polarity potential is supplied and a negative polarity period in which the negative polarity potential is supplied have different lengths.

An electronic apparatus of the present application includes a first light source with an output light flux of 5000 lumen to 20000 lumen, a second light source with an output light flux of 5000 lumen to 20000 lumen, the liquid crystal apparatus according to claim 1 configured to modulate first light from the first light source, and a second liquid crystal apparatus configured to modulate second light from the second light source. The second liquid crystal apparatus includes a liquid crystal layer, a pixel electrode provided in a display region of the second liquid crystal apparatus and configured to be supplied with an image signal at a first frequency, and a first electrode provided in a region outside the display region and configured to be alternately supplied with a positive polarity potential with a potential higher than a predetermined potential and a negative polarity potential with a potential lower than the predetermined potential at a third frequency lower than the first frequency such that a positive polarity period in which the positive polarity potential is supplied and a negative polarity period in which the negative polarity potential is supplied have different lengths.

DESCRIPTION OF EXEMPLARY EMBODIMENTS

Figure 1:
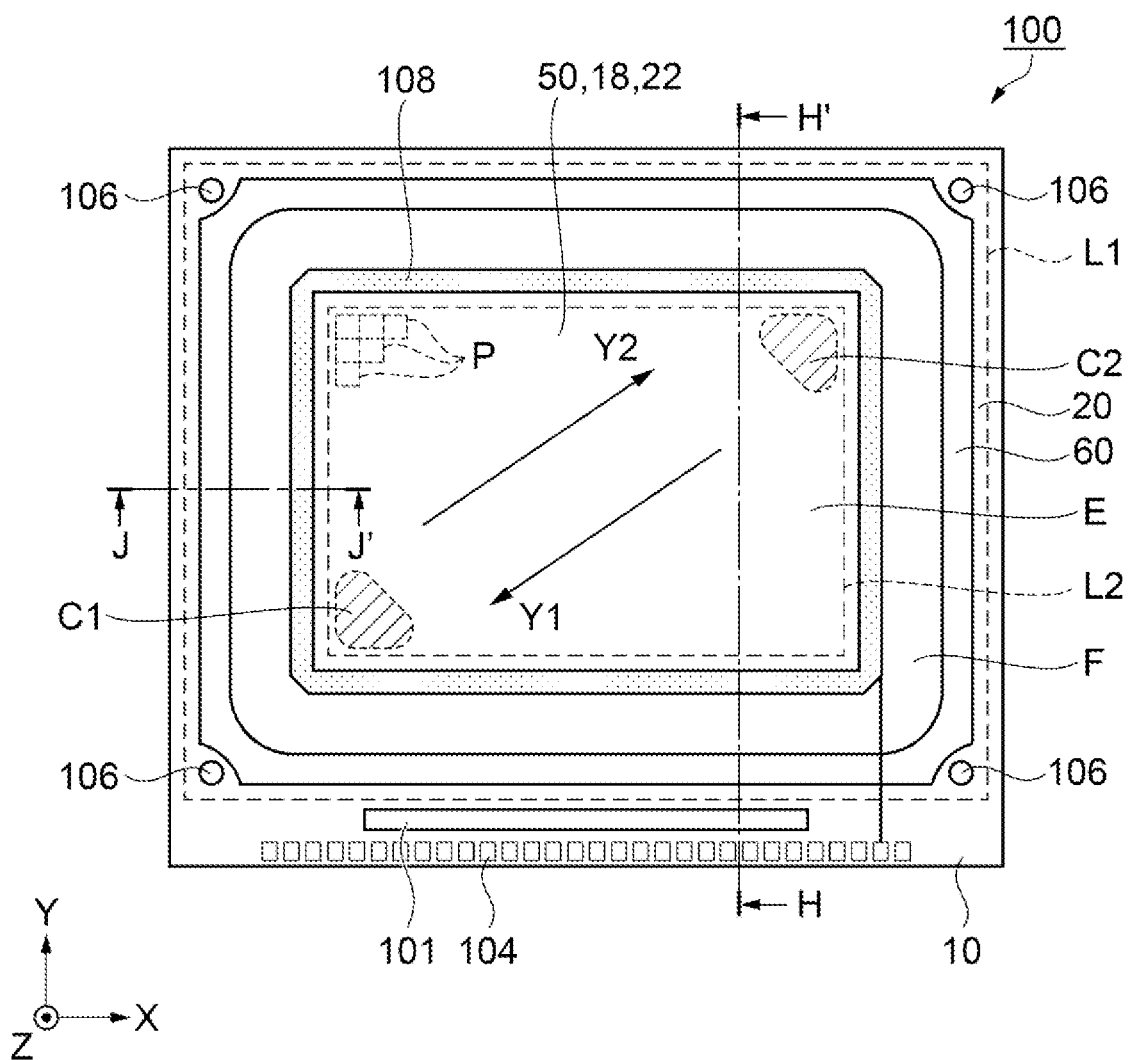
FIG. 1 is a plan view illustrating a schematic configuration of a liquid crystal apparatus according to Embodiment 1.

An embodiment of the present disclosure is described below with reference to the accompanying drawings.

In the following drawings, the members are not drawn to scale to illustrate the members in recognizable sizes. In addition, in the following drawings, XYZ axes are illustrated as mutually orthogonal coordinate axes as necessary. In the drawings, the directions pointed by the arrows along the axes are + directions, and the directions opposite to the + directions are − directions. Note that the +Z direction and the −Z direction may be referred to as upper side and lower side, respectively, and the view in the +Z direction is referred to as plan view or planar. Further, in the following description, a phrase "on a substrate" for the substrate means placement on the substrate in contact with the substrate, placement on the substrate with another structure therebetween, or placement on the substrate partially with another structure therebetween, for example.

1. Embodiment 1

FIG. 1 is a plan view of a liquid crystal apparatus as viewed from an opposed substrate side.

In this embodiment, as a liquid crystal apparatus 100, the liquid crystal apparatus 100 of an active drive type including a thin film transistor (TFT) serving as a pixel switching element for each pixel is described as an example. The liquid crystal apparatus 100 can be favorably used as a light modulation apparatus in a projection-type display apparatus 1000 serving as an electronic apparatus described later, for example.

1.1. Overview of Liquid Crystal Apparatus

As illustrated in FIG. 1, the liquid crystal apparatus 100 includes an element substrate 10 and an opposed substrate 20 indicated by the broken line L1. Note that the configurations indicated by the solid line inside the outer edge of the opposed substrate 20 indicated by the broken line L1 are configurations provided between the opposed substrate 20 and the element substrate 10.

A sealing material 60 is provided in a frame shape along the outer edge of the opposed substrate 20. The sealing material 60 is an adhesive agent composed of a light curing resin, a thermosetting resin or the like, and contains a gap material, such as glass fibers and glass beads, for setting the distance between the substrates to a predetermined value.

The region surrounded by the broken line L2 is a display region E, in which pixels P are disposed in a matrix.

The region between the display region E and the sealing material 60 is a light-shielded peripheral region F. A frame-shaped first electrode 108 is disposed at the innermost periphery of the peripheral region F. Specifically, the frame-shaped first electrode 108 is provided in the light blocking region at the outer periphery of the display region E.

The first electrode 108 is electrically connected to an external terminal 104, and an AC signal is supplied from the outside. The AC signal generates at the first electrode 108 an electric field for attracting and holding ionic impurities from the display region E, and pushing the ionic impurities attracted to the first electrode 108 away to the display region E.

In the light-shielded peripheral region F, a scan line driving circuit not illustrated in the drawing is disposed.

At a portion of the element substrate 10 protruded from the opposed substrate 20 on the lower side in drawing outside the sealing material 60, a data line driving circuit 101 and a plurality of the external terminals 104 are disposed.

An inter-substrate conduction part 106 for electrical conduction between the element substrate 10 and the opposed substrate 20 is disposed at each corner of the opposed substrate 20.

A liquid crystal layer 50 described later is disposed between the element substrate 10 and the opposed substrate 20 in the display region E, a first alignment layer 18 is disposed at the surface of the element substrate 10 on the liquid crystal layer 50 side, and a second alignment layer 22 is disposed at the surface of the opposed substrate 20 on the liquid crystal layer 50 side.

The first alignment layer 18 and the second alignment layer 22 include an oblique vapor deposition layer formed by an oblique vapor deposition method using inorganic materials such as silicon oxide, aluminum oxide and magnesium oxide. The oblique vapor deposition direction of the first alignment layer 18 is the direction indicated by arrow Y1 that intersects the Y direction at a predetermined orientation angle from the upper right to the lower left in the drawing on the element substrate 10 side, and is the direction indicated by the arrow Y2 that intersects the Y direction at a predetermined orientation angle from the lower left to the upper right in the drawing on the opposed substrate 20 side. The predetermined angle is 45 degrees, for example. Note that the oblique vapor deposition direction illustrated in the drawing is a direction when the liquid crystal apparatus 100 is viewed from the opposed substrate 20 side. In addition, the predetermined orientation angle is not limited to the orientation angle illustrated in the drawing.

When an electric field is applied to the liquid crystal layer 50, a liquid crystal molecules 50a described later behave or vibrate, and the flow in the oblique directions indicated by the arrows Y1 and Y2 is generated in the liquid crystal layer 50. When the liquid crystal layer 50 contains ionic impurities of positive polarity or negative polarity, the ionic impurities move toward corner portions C1 and C2 of the display region E along the flow in the liquid crystal layer 50 and aggregate around the corner portions C1 and C2. A possible reason that the ionic impurities aggregate at the corner portions C1 and C2 of the display region E is that the mobility of the ionic impurities in the light-shielded peripheral region F is lower than the mobility in the display region E irradiated with light and as a result the ionic impurities tend to stay at the corner portions C1 and C2 in front of the peripheral region F.

When the insulation resistance of the liquid crystal layer 50 is reduced at the pixels P located at the corner portions C1 and C2 due to the ionic impurities aggregated at the corner portion C1 and the corner portion C2, the driving potential is reduced at the pixels P, which is observed as unevenness in the display.

1.2. Overview of Cross-Sectional Configuration of Liquid Crystal Apparatus

Figure 2:
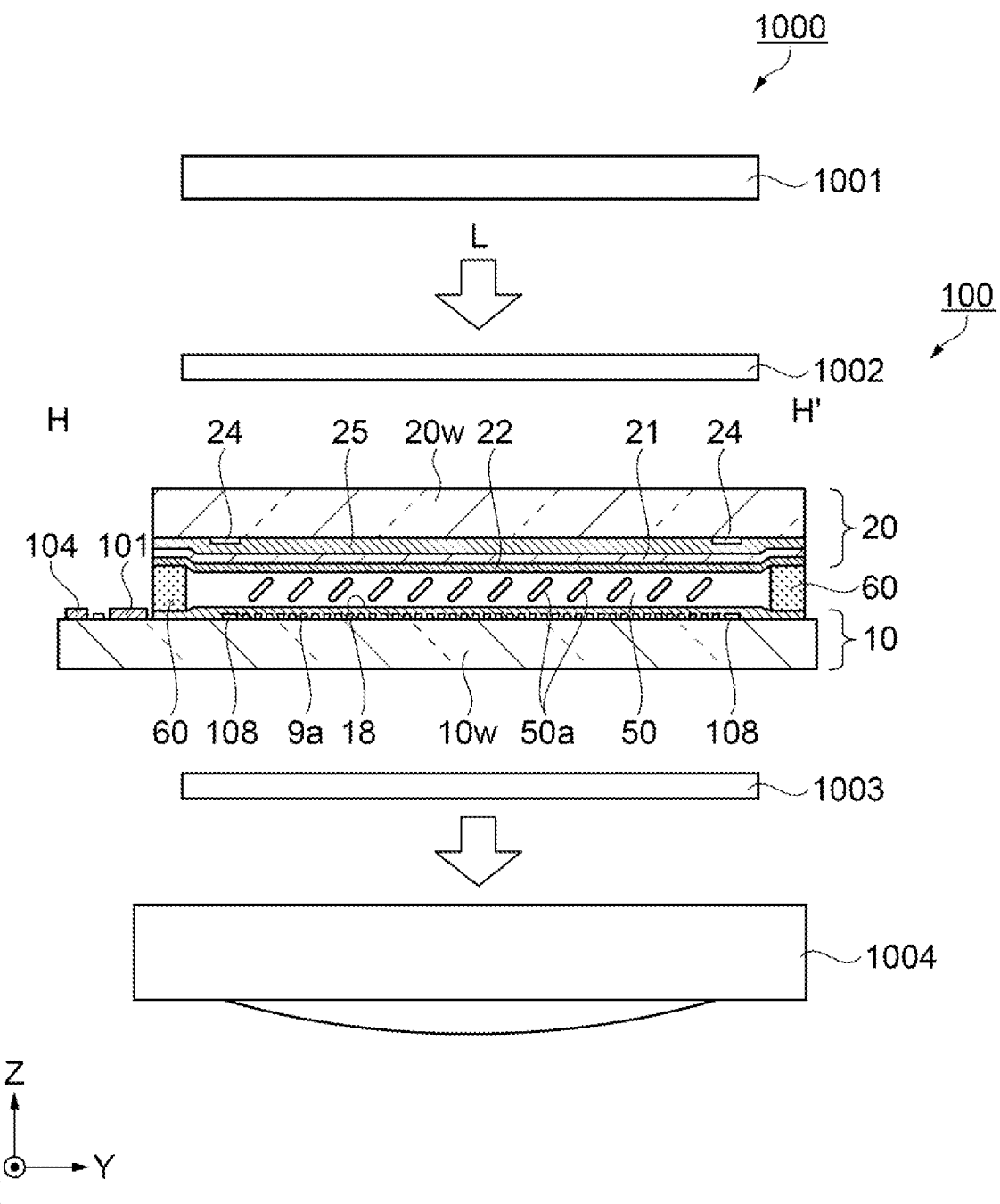
FIG. 2 is a sectional view taken along line H-H' of FIG. 1.

FIG. 2 is a sectional view illustrating a schematic configuration of the liquid crystal apparatus taken along line H-H' of FIG. 1. Note that FIG. 2 further illustrates an outline of a configuration of the projection-type display apparatus 1000 using the liquid crystal apparatus 100.

As illustrated in FIG. 2, the liquid crystal apparatus 100 includes the liquid crystal layer 50 between the element substrate and the opposed substrate 20, with the element substrate 10 and the opposed substrate 20 bonded to each other with the sealing material at the outer edge.

The element substrate 10 includes, between its substrate 10w and the liquid crystal layer 50, an optically transparent pixel electrode 9a provided for each pixel P, the first electrode 108, and the first alignment layer 18 disposed to cover the pixel electrode 9a and the first electrode 108.

The opposed substrate 20 includes, between its substrate and the liquid crystal layer 50, a parting line 24, an insulation layer 25, an opposing electrode 21, and the second alignment layer 22 disposed to cover the opposing electrode 21.

The parting line 24 is a light shield layer composed of a light-shielding material that surrounds the display region E in the peripheral region F, and is provided at a position overlapping circuits such as an inspection circuit and a scan line driving circuit disposed in the peripheral region F, in plan view. The parting line 24 achieves shielding to prevent light L entering these circuits from the opposed substrate 20 side, and prevents erroneous operations of circuits. In addition, the parting line 24 achieves shielding to prevent unnecessary stray light from entering the display region E, and ensures high contrast in the display of the display region E.

The pixel electrode 9a and the opposing electrode 21 are formed with a transparent conductive material such as indium tin oxide (ITO), for example. Each of the substrate 10w and the substrate 20w is an optically transparent substrate, and a glass substrate or a quartz substrate is used, for example.

The liquid crystal layer 50 is composed of liquid crystals with negative dielectric anisotropy, for example. The liquid crystal molecules 50a with negative dielectric anisotropy are substantially vertically aligned (VA: Vertical Alignment) at a predetermined pre-tilt angle with respect to the normal direction of the alignment layer surface of the first alignment layer 18 and the second alignment layer 22.

The projection-type display apparatus 1000 includes a laser light source 1001, an incident side polarization plate 1002, the liquid crystal apparatus 100, an emission side polarization plate 1003, and a projection lens 1004.

The laser light source 1001 is a high-light flux and high-luminance light source whose output light flux is 5000 lumen to 20000 lumen.

By using the laser light source 1001 having such a large light emission region, the radiation angle of the light L emitted from the laser light source 1001 can be reduced. Thus, the display region E of the liquid crystal apparatus 100 can be irradiated with the light L without using a condenser lens, a rod integrator or the like between the laser light source 1001 and the liquid crystal apparatus 100. In addition, a projection lens with a small diameter and a large F-number may be used for the projection lens 1004.

Thus, the downsizing of the projection-type display apparatus 1000 can be achieved.

Note that in the case where the light L emitted from the laser light source 1001 is linear polarized light, the incident side polarization plate 1002 may not be provided. For example, in the case where a photonic crystal laser including a photonic crystal structure is used as the laser light source 1001, linear polarized light can be output.

The liquid crystal apparatus 100 may be a monochromatic panel or a color panel.

1.3. Overview of Pixel Circuit

Figure 3:
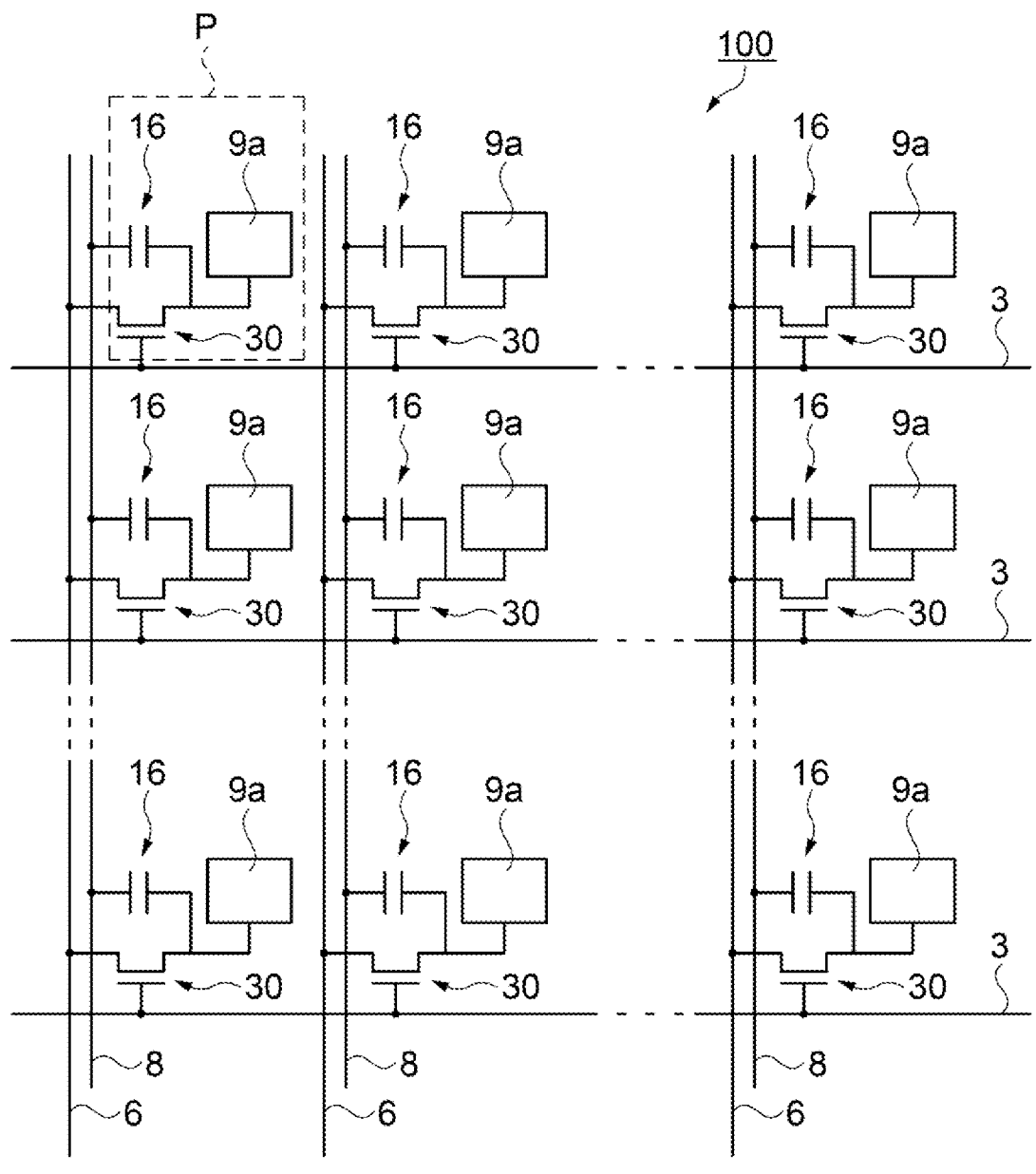
FIG. 3 is an equivalent circuit diagram illustrating an electrical configuration of the liquid crystal apparatus of FIG. 1.

FIG. 3 is an equivalent circuit diagram illustrating an electrical configuration of the display region E.

In the display region E of the liquid crystal apparatus 100, a scan line 3, a data line 6 and a capacitance line 8 are disposed. The pixels P are located at the intersections of the scan line 3 and the data line 6. The pixel P includes the pixel electrode 9a, a thin film transistor (TFT) 30 and a capacitive element 16. One electrode of the capacitive element 16 is electrically connected to the pixel electrode 9a, and the other electrode is electrically connected to the capacitance line 8. The gate electrode of the TFT 30 is electrically connected to the scan line 3, the source electrode is electrically connected to the data line 6, and the drain electrode is connected to the pixel electrode 9a.

A scanning signal from a scan line driving circuit is supplied to a plurality of the scan lines 3 in a predetermined order. A plurality of the pixels P electrically connected to the same scan line 3 are controlled to be turned on or off at the same time with the same scanning signal.

An image signal is supplied to a plurality of the data lines 6 from the data line driving circuit 101 in a predetermined order, and the image signal is supplied to the pixel electrode 9a of the pixel P selected by the scanning signal.

1.4. Overview of Peripheral Region

Figure 4:
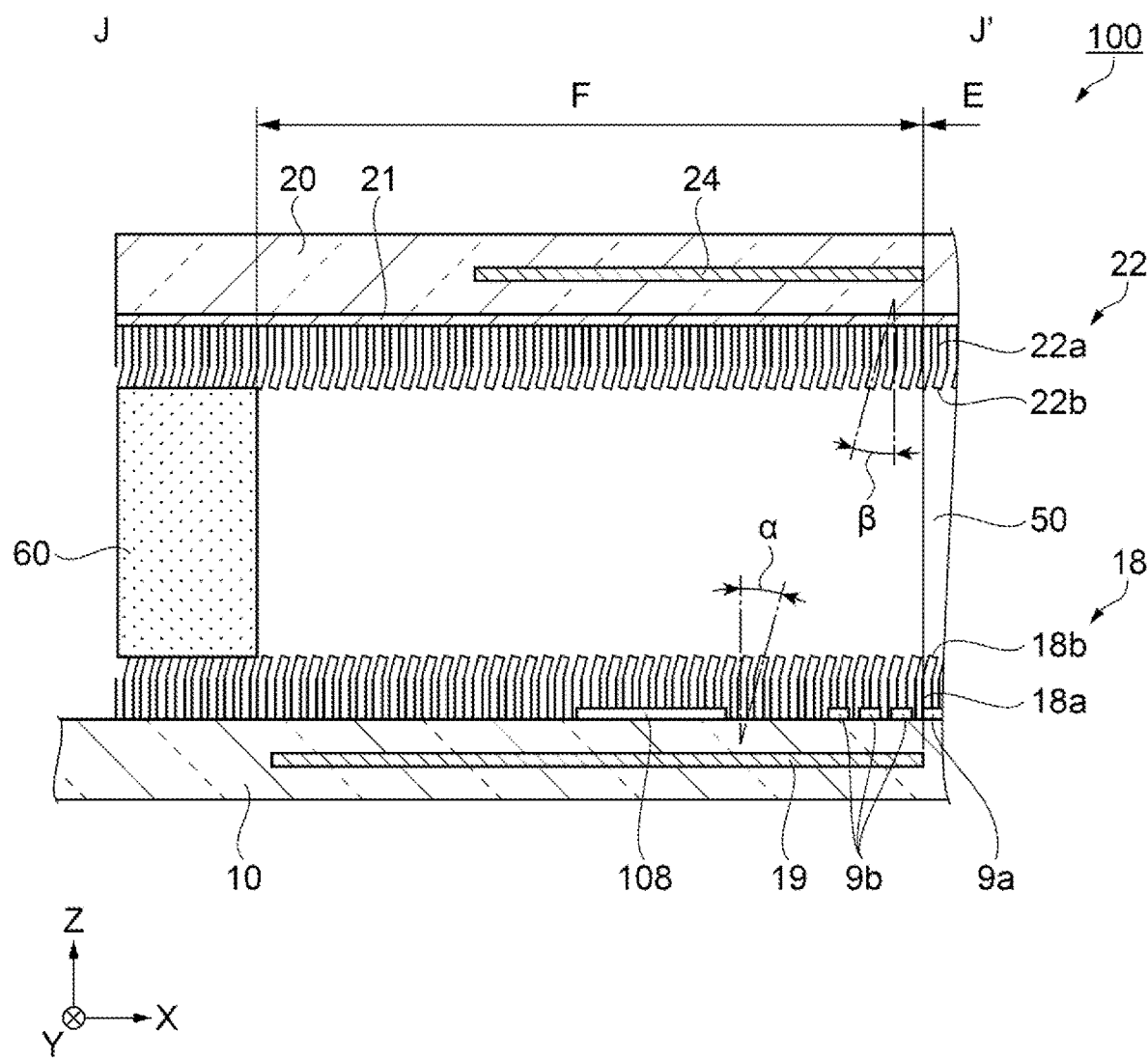
FIG. 4 is a sectional view taken along line J-J' of FIG. 1.

FIG. 4 is a sectional view taken along line J-J' of FIG. 1, and illustrates a configuration of the peripheral region F. Note that in the drawing, configurations of some parts such as the scan line driving circuit are omitted.

As illustrated in the drawing, the first electrode 108 is disposed on the same layer as the pixel electrode 9a and a dummy pixel electrode 9b, and is formed with the same material as the pixel electrode 9a.

The first alignment layer 18 includes a first vapor deposition film 18a, and a second vapor deposition film 18b disposed between the first vapor deposition film 18a and the liquid crystal layer 50. The first vapor deposition film 18a coves the pixel electrode 9a of the display region E and the dummy pixel electrode 9b and the first electrode 108 of the peripheral region F, and is disposed above them.

The second alignment layer 22 includes a third vapor deposition film 22a, and a fourth vapor deposition film 22b disposed between the third vapor deposition film 22a and the liquid crystal layer 50.

The first vapor deposition film 18a is formed by a vapor deposition method from the direction along the normal of the plane of the element substrate 10, and includes a plurality of columns whose longitudinal axial direction is aligned along the Z axis. The column is a columnar crystalline form made of an inorganic material such as silicon oxide. The third vapor deposition film 22a is formed by a vapor deposition method from the direction along the normal of the plane of the opposed substrate 20, and includes a plurality of columns whose longitudinal axial direction is aligned with the Z axis as with the first vapor deposition film 18a.

The second vapor deposition film 18b is provided to cover the +Z direction side of the first vapor deposition film 18a. The thickness of the second vapor deposition film 18b, i.e., the distance in the direction along the Z axis is smaller than the thickness of the first vapor deposition film 18a. The second vapor deposition film 18b includes a plurality of columns whose longitudinal axial direction intersects the normal direction of the plane of the element substrate 10, at an angle α. The column is formed by an oblique vapor deposition method. More specifically, the column of the second vapor deposition film 18b is formed through oblique vapor deposition of an inorganic material such as silicon oxide from the direction along the direction of the angle α.

The fourth vapor deposition film 22b is disposed to cover the −Z direction side of the third vapor deposition film 22a. The thickness of the fourth vapor deposition film 22b, i.e., the distance in the direction along the Z axis is smaller than the thickness of the third vapor deposition film 22a. The fourth vapor deposition film 22b includes a plurality of columns whose longitudinal axial direction intersects the normal direction of the plane of the opposed substrate 20, at an angle β. The column is formed by an oblique vapor deposition method. More specifically, the column of the fourth vapor deposition film 22b is formed through oblique vapor deposition of an inorganic material such as silicon oxide from the direction along the direction of the angle β. Note that the angle β and the angle α may be equal to each other.

Note that while the pre-tilt angle of the liquid crystal molecules 50a is not necessarily identical to the inclination angle α of the column of the second vapor deposition film 18b and the inclination angle β of the column of the fourth vapor deposition film 22b, the pre-tilt angle of the liquid crystal molecules 50a can be controlled at a desired angle by controlling the inclination angle α of the column of the second vapor deposition film 18b and the inclination angle β of the column of the fourth vapor deposition film 22b.

A surface treatment using a silane coupling agent is provided on the surfaces of the first alignment layer 18 and the second alignment layer 22. More specifically, at the surfaces of the second vapor deposition film 18b of the element substrate 10 and the fourth vapor deposition film 22b of the opposed substrate 20, an organo polysiloxane film is formed by using a silane coupling agent.

The silane coupling agent dehydration-condenses with the silanol groups bonded to the silicon oxide of the second vapor deposition film 18b and the fourth vapor deposition film 22b. In this manner, an organo polysiloxane film with oriented hydrophobic groups is formed at the interface with the liquid crystal layer 50. This surface treatment increases the contact angle with respect to water of the surfaces of the second vapor deposition film 18b and the fourth vapor deposition film 22b, and can improve the light resisting property of the liquid crystal apparatus 100. Note that publicly known methods may be employed for the method of the surface treatment using silane coupling agent.

A light shield layer 19 is disposed at the element substrate 10. As with the parting line 24, the light shield layer 19 is disposed to overlap the first electrode 108 in plan view. The light shield layer 19 prevents light reflected by the emission side polarization plate 1003 or the like from entering the peripheral region F, and suppresses entry of unnecessary stray light into the display region E.

1.5. Overview of Voltage Waveform Supplied to First Electrode

Figure 5:
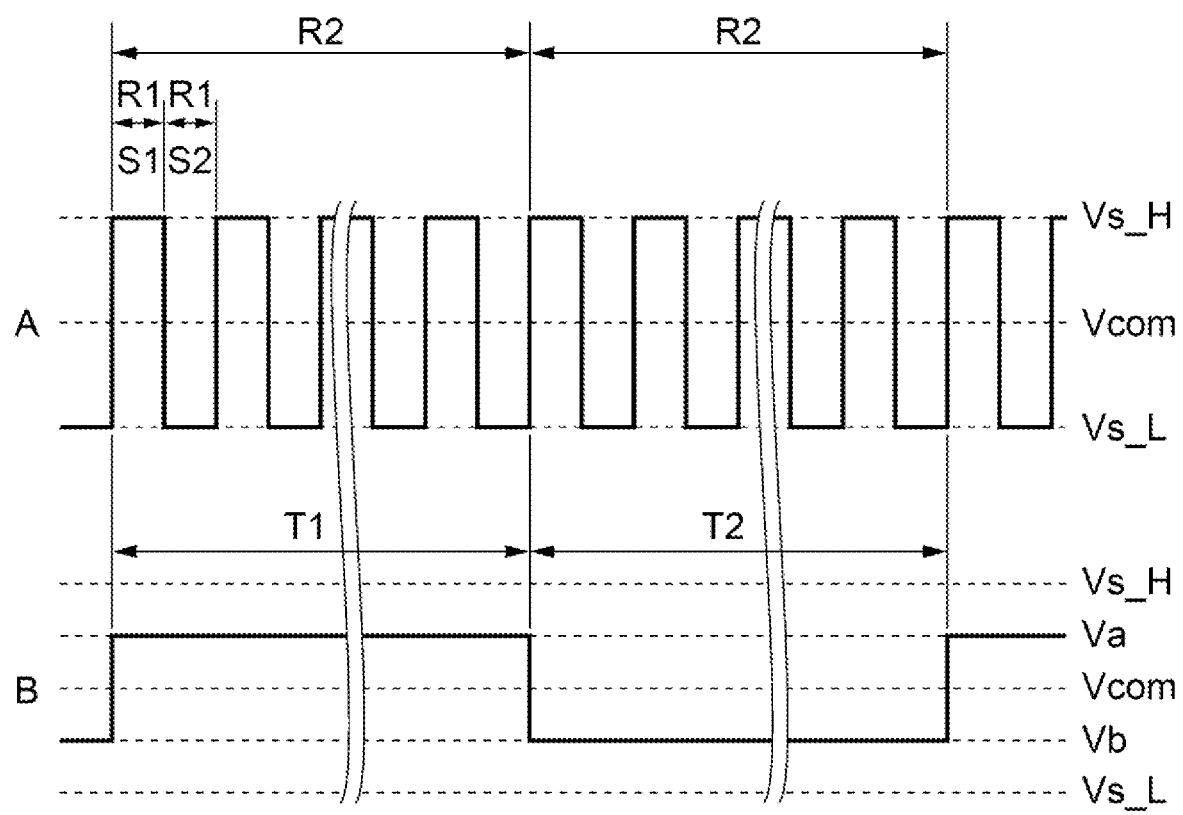
FIG. 5 is a waveform diagram of a voltage supplied to a pixel electrode and a first electrode.

FIG. 5 is a waveform diagram of an analog voltage signal supplied to a pixel electrode and a first electrode.

A signal waveform A represents a voltage waveform of a gradation signal supplied to the pixel electrode 9a. The signal waveform A includes a positive polarity period S1 and a negative polarity period S2, and has a waveform in which the positive polarity period S1 and the negative polarity period S2 alternately appear. The positive polarity period S1 is a period in which a positive gradation potential with a high potential with respect to a common potential Vcom is supplied, and the negative polarity period S2 is a period in which a negative gradation potential with a low potential with respect to the common potential Vcom, which is a predetermined potential supplied to the opposing electrode 21, is supplied.

In the positive polarity period S1, a positive gradation potential corresponding to the gradation information of the image signal is supplied to the pixel electrode 9a, and the pixel electrode 9a is set to the positive gradation potential. A positive gradation potential Vs_H is a gradation potential corresponding to white gradation in a normally black system.

In the negative polarity period S2, a negative gradation potential corresponding to the gradation information of the image signal is supplied to the pixel electrode 9a, and the pixel electrode 9a is set to the negative gradation potential. A negative gradation potential Vs_L is a gradation potential corresponding to a white gradation in a normally black system.

A positive gradation potential or a negative gradation potential is supplied to the pixel electrode 9a at a first frequency that is the refresh rate of the pixel electrode 9a, and the pixel electrode 9a is set to the positive gradation potential or the negative gradation potential. In this embodiment, the first frequency is 240 Hz, and a refresh period R1 based on the first frequency is approximately 4.2 ms. Thus, the pixel electrode 9a is rewritten to a positive gradation potential or a negative gradation potential for each refresh period R1.

The refresh period R1 of the pixel electrode 9a has the same length for the positive polarity period S1 and the negative polarity period S2. Note that in the case where an interval period is provided between the positive polarity period S1 and the negative polarity period S2, the sum of the negative polarity period S2 or the positive polarity period S1 and the interval period has the same length as the refresh period R1.

A signal waveform B represents a voltage waveform supplied to the first electrode 108. The signal waveform B is a waveform including a positive polarity period T1 and a negative polarity period T2, in which the positive polarity period T1 and the negative polarity period T2 alternately appear. The positive polarity period T1 is a period in which a positive polarity potential Va with a high potential with respect to the common potential Vcom is supplied, and the negative polarity period T2 is a period in which a negative polarity potential Vb with a low potential with respect to the common potential Vcom is supplied.

In the positive polarity period T1, a positive polarity potential Va is supplied to the first electrode 108, and the potential of the first electrode 108 is set to the positive polarity potential Va. In addition, in the negative polarity period T2, the negative polarity potential Vb is supplied to the first electrode 108, and the potential of the first electrode 108 is set to the negative polarity potential Vb.

Note that the positive polarity potential Va is preferably set to a potential higher than the common potential Vcom by approximately 1.5 V. In addition, the negative polarity potential Vb is preferably set to a potential lower than the common potential Vcom by approximately 1.5 V. A reason for this is that bubble may be generated at the first electrode 108 when the potential difference between the positive polarity potential Va and the negative polarity potential Vb, and the common potential Vcom exceeds 3 V.

The positive polarity potential Va or the negative polarity potential Vb is supplied to the first electrode 108 at a second frequency that is the refresh rate of the first electrode 108, and the first electrode 108 is set to the positive polarity potential Va or the negative polarity potential Vb. In this embodiment, the second frequency is 0.1 Hz, and a refresh period R2 based on the second frequency is 10 s. Thus, the first electrode 108 is rewritten to the positive polarity potential Va or the negative polarity potential Vb for each refresh period R2.

The refresh period R2 of the first electrode 108 is longer than the refresh period R1 of the pixel electrode 9a, and preferably, the refresh period R2 of the first electrode 108 is 100 times to 100000 times the refresh period R1 of the pixel electrode 9a. More specifically, in the case where the refresh period R1 is approximately 4.2 ms, the refresh period R2 is preferably approximately 420 ms to 420 s.

The refresh period R2 of the first electrode 108 is the same for the positive polarity period T1 and the negative polarity period T2. Note that in the case where an interval period is provided between the positive polarity period T1 and the negative polarity period T2, the sum of the positive polarity period T1 or the negative polarity period T2 and the interval period has the same length as the refresh period R2.

The present inventors have confirmed that with the refresh period R2 of the first electrode 108 longer than the refresh period R1 of the pixel electrode 9a and the positive polarity period T1 and the negative polarity period T2 of the first electrode 108 having the same length, generation of blemish in the display region E and generation of burn-in display unevenness can be suppressed. Furthermore, it is also confirmed that with the refresh period R2 of the first electrode 108 set to 100 times to 100000 times the refresh period R1 of the pixel electrode 9a, generation of the display unevenness can be more effectively suppressed.

As described above, with the liquid crystal apparatus 100 of this embodiment or the projection-type display apparatus 1000 as an electronic apparatus including the liquid crystal apparatus 100, the following effects can be achieved.

The liquid crystal apparatus 100 includes the pair of substrates 10 and 20 opposite to each other with the liquid crystal layer 50 therebetween, the pixel electrode 9a provided in the display region E of the pair of substrates 10 and 20 and configured to be supplied with an image signal at the first frequency, and the first electrode 108 provided in the peripheral region F as a region outside the display region E and configured to be alternately supplied with the positive polarity potential Va with a potential higher than the predetermined potential and the negative polarity potential Vb with a potential lower than the predetermined potential at the second frequency lower than the first frequency such that the positive polarity period T1 for setting a positive polarity potential and the negative polarity period T2 for setting a negative polarity potential have the same length.

With this configuration, the positive polarity potential and the negative polarity potential are alternately supplied in the same length to the first electrode 108 provided in the peripheral region F as a region outside the display region E at the second frequency that is a refresh rate lower than the first frequency that is the refresh rate of the pixel electrode 9a, and thus ionic impurities can be attracted and held at the peripheral region F.

In this manner, generation of burn-in can be suppressed while suppressing generation of blemish in the display region E. Thus, even in the case where a high-luminance light source is used, the liquid crystal apparatus 100 with excellent display quality can be provided.

The second frequency that is the refresh rate of the first electrode 108 is set to ten-thousandth to one-hundredth of the first frequency. With this configuration, in comparison with the case with other frequencies, the effect of suppressing generation of blemish in the display region E can be increased.

Light from the light source 1001 with an output light flux of 5000 lumen to 20000 is incident on the liquid crystal layer 50.

With this configuration, in the case where the laser light source 1001 that is a high-luminance light source with an output light flux of 5000 lumen to 20000 is employed as the light source combined with the liquid crystal apparatus 100, generation of blemish in the display region E that tends to be generated due to irradiation with the high-light flux light L from the laser light source 1001 can be suppressed.

Specifically, when the high-light flux light L from the laser light source 1001 is incident on the liquid crystal layer 50 of the liquid crystal apparatus 100, the mobility of ionic impurities in the liquid crystal layer 50 increases and the ionic impurities easily move in the liquid crystal layer 50.

Then, if the driving frequency of the peripheral electrode is set to a value higher than the driving frequency of the pixel electrode as in a known configuration in the case where the mobility of ionic impurities is increased, the ionic impurities are more largely affected than in the known configuration by the electric field inverted in a short cycle, and repelled before attracted to the peripheral region. Consequently, the ionic impurities stay in the display region, making it difficult to attract and hold the ionic impurities in the peripheral region. Note that it can be considered that in the case where the mobility of ionic impurities is low as in the known configuration, the ionic impurities can be attracted to the peripheral region by the flow in the liquid crystal layer generated by setting the driving frequency of the peripheral electrode to a value higher than the driving frequency of the pixel electrode.

However, in the case where the positive polarity potential Va and the negative polarity potential Vb are supplied to the first electrode 108 at the second frequency lower than the first frequency that is the refresh rate of the pixel electrode 9a as in this embodiment, the inversion cycle of the polarity of the electric field of the first electrode 108 is lengthened. Then, when the inversion cycle of the polarity of the electric field of the first electrode 108 is lengthened, the time to attract the ionic impurities to the peripheral region F is also lengthened, and thus the ionic impurities can be attracted to the peripheral region F, while lengthening the time to hold at the ionic impurities the first electrode 108.

Thus, generation of blemish in the display region E can be suppressed even when the mobility of the ionic impurities of the liquid crystal layer 50 is increased by using the laser light source 1001.

Furthermore, since the positive polarity period T1 for setting to the positive polarity potential Va and the negative polarity period T2 for setting to the negative polarity potential Vb at the first electrode 108 have the same length, generation of burn-in due to application of a DC signal to the first electrode 108 can also be suppressed.

The projection-type display apparatus 1000 includes the liquid crystal apparatus 100. With this configuration, an excellent projection-type display apparatus 1000 including the liquid crystal apparatus 100 that can suppress generation of blemish in the display region E can be provided.

The projection-type display apparatus 1000 includes the laser light source 1001 with an output light flux of 5000 lumen to 20000 lumen, and the liquid crystal apparatus 100 that modulates the light L from the laser light source 1001. With this configuration, it is possible to provide an excellent projection-type display apparatus 1000 including the liquid crystal apparatus 100 that can suppress generation of blemish in the display region E in the case where the laser light source 1001 that is a high-luminance light source with an output light flux of 5000 lumen to 20000 lumen is employed as the light source combined with the liquid crystal apparatus 100.

2. Embodiment 2

Figure 6:
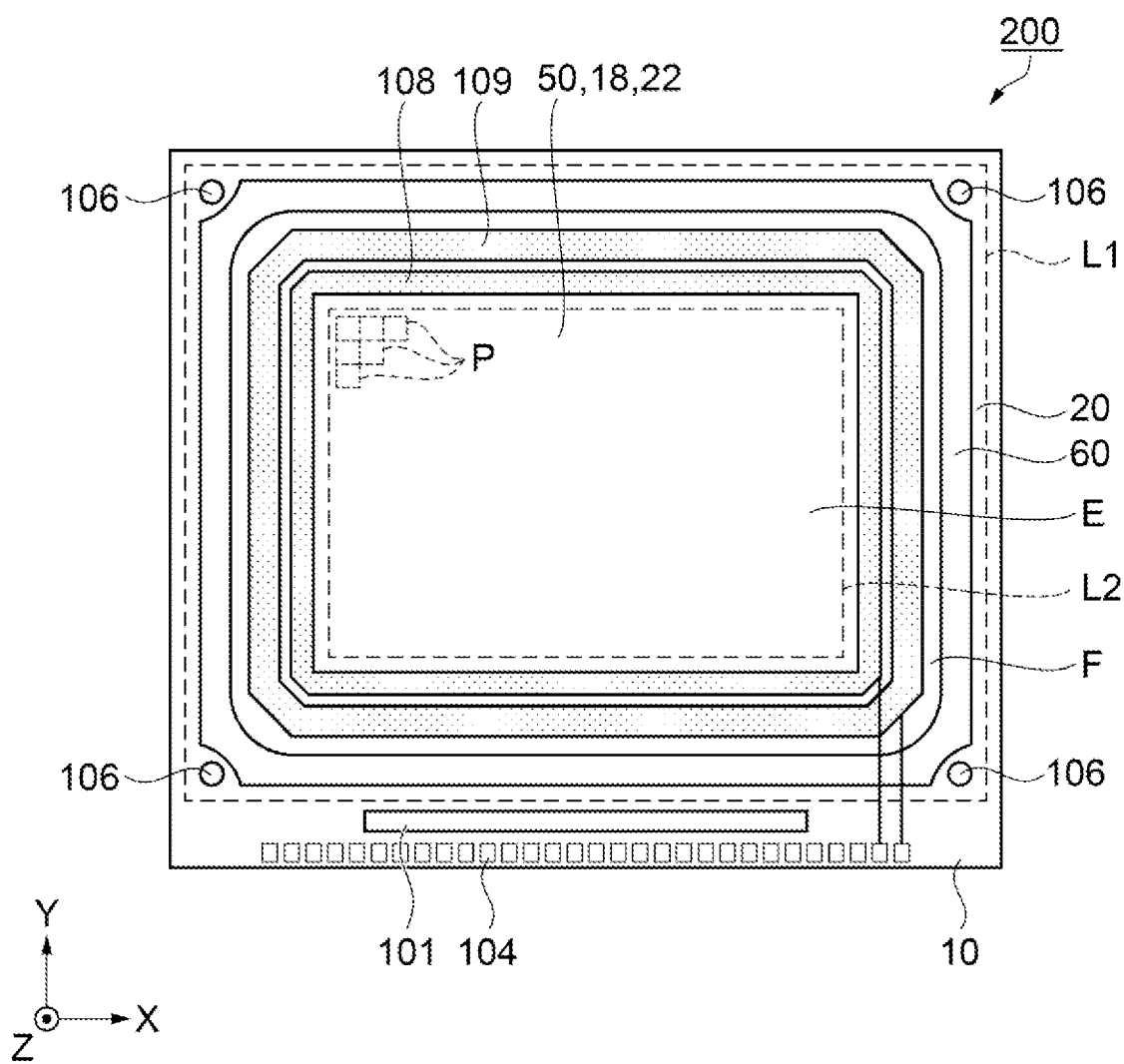
FIG. 6 is a plan view illustrating a schematic configuration of a liquid crystal apparatus according to Embodiment 2.

FIG. 6 is a plan view of a liquid crystal apparatus as viewed from an opposed substrate side.

A liquid crystal apparatus 200 of this embodiment is different from the liquid crystal apparatus 100 of Embodiment 1 in that a second electrode 109 is provided. Note that in the following description, the same configurations as those of Embodiment 1 are denoted with the same reference numerals, and overlapping descriptions will be omitted.

As illustrated in the drawing, the liquid crystal apparatus 200 includes the second electrode 109 disposed between the first electrode 108 and the sealing material 60 in plan view. As with the first electrode 108, the second electrode 109 is disposed on the same layer as the pixel electrode 9a and the dummy pixel electrode 9b, and formed with the same material as the pixel electrode 9a.

The second electrode 109 is electrically connected to the external terminal 104, and is supplied with a DC signal for generating the electric field for holding ionic impurities from the outside. The DC signal is a signal of positive polarity with a potential higher than the common potential Vcom, and generates an electric field for holding, at the second electrode 109, the negative ionic impurities attracted by the first electrode 108 in the second electrode 109.

The potential supplied to the second electrode 109 is the same potential as the positive polarity potential Va supplied to the first electrode 108. Alternatively, the effect of the second electrode 109 for holding negative ionic impurities at the second electrode 109 may be increased by setting the potential supplied to the second electrode 109 to a potential higher than the positive polarity potential Va supplied to the first electrode 108.

As described above, according to the liquid crystal apparatus 200 of this embodiment, the following effects can be achieved in addition to the effects of Embodiment 1.

The liquid crystal apparatus 200 includes the second electrode 109 provided outside the first electrode 108 in the peripheral region F as a region outside the display region E, and is supplied with a DC signal.

With this configuration, ionic impurities can be more reliably held in the peripheral region F with the second electrode 109, and the effect of suppressing generation of blemish in the display region E can be increased. Thus, even in the case where a high-luminance light source is used, the liquid crystal apparatus 200 with excellent display quality can be provided.

The DC signal is a signal of positive polarity with a potential higher than a predetermined potential. With this configuration, negative ionic impurities, which are considered to be a main cause of blemish, can be more reliably held in the peripheral region F, and thus the effect of suppressing generation of blemish in the display region E can be increased.

3. Embodiment 3

3.1. Overview of Electronic Apparatus

Figure 7:
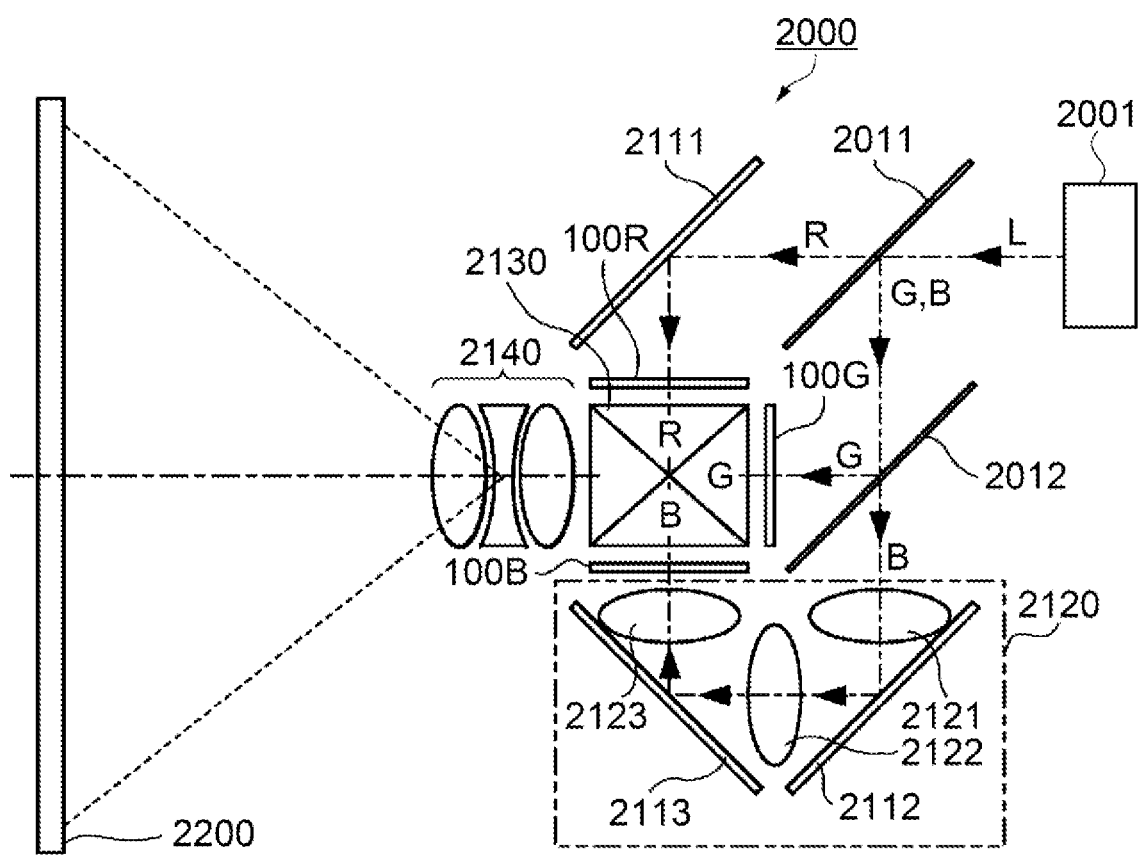
FIG. 7 is a schematic configuration diagram of a projection-type display apparatus serving as an electronic apparatus according to Embodiment 3.

FIG. 7 is a schematic configuration diagram illustrating a configuration of a projection-type display apparatus serving as an electronic apparatus according to this embodiment.

As illustrated in the drawing, a projection-type display apparatus 2000 includes a laser light source 2001, dichroic mirrors 2011 and 2012 serving as light splitting members, three liquid crystal apparatuses, 100B, 100G and 100R, each of which is the liquid crystal apparatus 100, three reflection mirrors 2111, 2112 and 2113, three relay lenses 2121, 2122 and 2123, a dichroic prism 2130 serving as a color synthesis optical system, and a projection lens 2140 serving as a projection optical system.

The laser light source 2001 is a high-light flux and high-luminance light source whose output light flux is 5000 lumen to 20000 lumen. As the laser light source 2001, a surface-emission type semiconductor laser having a light emission region with an area equal to or greater than that of the display region E may be employed, for example.

The light L emitted from the laser light source 2001 is separated by the two dichroic mirrors 2011 and 2012 into color light of three colors of respective different wavelength ranges. The color light of three colors is substantially red light, which is light in the wavelength range including the red wavelength band, substantially green light, which is light in the wavelength range including the green wavelength band, and substantially blue light, which is light in the wavelength range including the blue wavelength band. In the following description, the above-mentioned substantially red light, substantially green light and substantially blue light are also referred to as green light G, red light R, and blue light B, respectively.

The dichroic mirror 2011 transmits the red light R, and reflects the green light G and blue light B with shorter wavelength than the red light R. The red light R transmitted through the dichroic mirror 2011 is reflected by reflection mirror 2111, and enters the liquid crystal apparatus 100R. The green light G reflected by the dichroic mirror 2011 enters the liquid crystal apparatus 100G after being reflected by the dichroic mirror 2012. The blue light B reflected by the dichroic mirror 2011 is transmitted through the dichroic mirror 2012 and is emitted to a relay lens system 2120.

The relay lens system 2120 includes relay lenses 2121, 2122 and 2123 and reflection mirrors 2112 and 2113. The blue light B has a light path longer than that of the green light G and the red light R, and tends to have a large light flux. In view of this, increase of the light flux is suppressed by using the relay lens 2122. The blue light B incident on the relay lens system 2120 is reflected by the reflection mirror 2112 and converged by the relay lens 2121 in the vicinity of the relay lens 2122. Then, the blue light B enters the liquid crystal apparatus 100B through the reflection mirror 2113 and the relay lens 2123.

The liquid crystal apparatus 100 according to Embodiment 1 is applied to the liquid crystal apparatuses 100R, 100G and 100B serving as light modulation apparatuses in the projection-type display apparatus 2000. In addition, the liquid crystal apparatus 200 according to Embodiment 2 may be applied to the liquid crystal apparatuses 100R, 100G and 100B serving as light modulation apparatuses. Alternatively, the liquid crystal apparatus 200 may be applied only to the liquid crystal apparatus 100B, or only to the liquid crystal apparatuses 100G and 100B.

Each of the liquid crystal apparatuses 100R, 100G and 100B is electrically connected to a higher-level circuit of the projection-type display apparatus 2000. In this manner, image signals for setting the gradation levels of the red light R, the green light G and the blue light B are supplied from an external circuit, and processed in the higher-level circuit. In this manner, the liquid crystal apparatuses 100R, 100G and 100B are driven, and the light of respective colors is modulated.

The red light R, the green light G and the blue light B modulated by the liquid crystal apparatuses 100R, 100G and 100B are incident on the dichroic prism 2130 from the three directions. The dichroic prism 2130 synthesizes the incident red light R, green light G and blue light B. The dichroic prism 2130 reflects the red light R and the blue light B at 90 degrees, and transmits the green light G. Thus, the red light R, the green light G and the blue light B are synthesized as display light for displaying a color image, and emitted toward the projection lens 2140.

The projection lens 2140 is disposed to face the outside of the projection-type display apparatus 2000. The display light is emitted in an enlarged manner through the projection lens 2140, and is projected on a screen 2200 serving as a projection object.

While the light L from the laser light source 2001 is split by the dichroic mirrors 2011 and 2012 into the color light of three colors of respective different wavelength ranges and applied to the liquid crystal apparatuses 100R, 100G and 100B in the above-mentioned embodiment, the configuration of the light source is not limited to this, and the laser light source 1001 may be disposed in each of the liquid crystal apparatuses 100R, 100G and 100B.

3.2. Overview of Voltage Waveform Supplied to First Electrode

Figure 8:
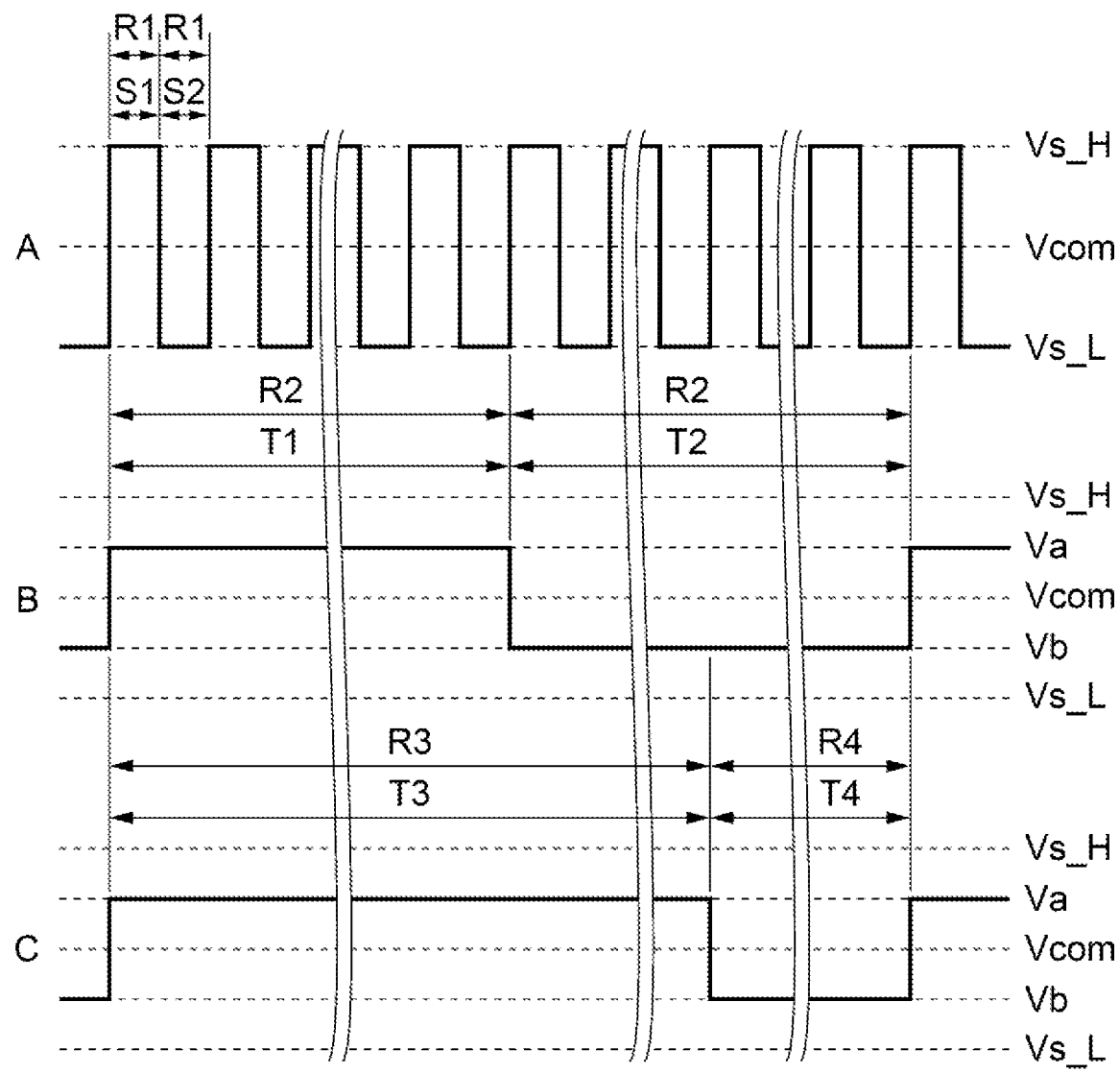
FIG. 8 is a waveform diagram of a voltage supplied to a pixel electrode and a first electrode.

FIG. 8 is a waveform diagram of an analog voltage signal supplied to a pixel electrode and a first electrode. In the following description, the same configurations as those of the above-described embodiment are denoted with the same reference numerals, and overlapping descriptions will be omitted.

The signal waveform A represents a voltage waveform of a gradation signal supplied to the pixel electrode 9a as with the signal waveform A of FIG. 5.

The signal waveform B represents the voltage waveform supplied to the first electrode 108 of the liquid crystal apparatus 100G into which the green light G is entered, and the signal waveform C represents the voltage waveform supplied to the first electrode 108 of the liquid crystal apparatus 100B into which the blue light B is entered.

The signal waveform B is a voltage waveform in which the positive polarity period T1 and the negative polarity period T2 with the same length as the positive polarity period T1 are alternately repeated for each refresh period R2 as with the signal waveform B of FIG. 5.

The signal waveform C is a waveform including a positive polarity period T3 and a negative polarity period T4, in which the positive polarity period T3 and the negative polarity period T4 alternately appear. The length of the positive polarity period T3 is longer than the negative polarity period T4, and more specifically, the ratio of the length of the positive polarity period T3 to the length of the negative polarity period T4 is preferably 3:1. The positive polarity period T3 is a period in which the positive potential Va with a high potential with respect to the common potential Vcom is supplied as in the positive polarity period T1, and the negative polarity period T4 is a period in which the negative polarity potential Vb with a low potential with respect to the common potential Vcom is supplied as in the negative polarity period T2.

In the positive polarity period T3, the positive polarity potential Va is supplied to the first electrode 108 of the liquid crystal apparatus 100B, and the potential of the first electrode 108 is set to the positive polarity potential Va. In the negative polarity period T4, the negative polarity potential Vb is supplied to the first electrode 108 of the liquid crystal apparatus 100B, and the potential of the first electrode 108 is set to the negative polarity potential Vb.

In this embodiment, the contact angle with respect to water at the surfaces of the first alignment layer 18 and the second alignment layer 22 of the liquid crystal apparatus 100B is greater than the contact angle with respect to water at the surfaces of the first alignment layer 18 and the second alignment layer 22 of the liquid crystal apparatus 100G. More specifically, the contact angle of the liquid crystal apparatus 100G is smaller than 50°, and the contact angle of the liquid crystal apparatus 100B is 50° or greater, or preferably, 60° to 90°.

A refresh period R3 and a refresh period R4 of the first electrode 108 of the liquid crystal apparatus 100B are longer than the refresh period R1 of the pixel electrode 9a.

Note that as illustrated in the drawing, the refresh period R3 and the refresh period R4 of the first electrode 108 of the liquid crystal apparatus 100B have different lengths. Thus, a third frequency that is the refresh rate of the first electrode 108 of the liquid crystal apparatus 100B contains two types of frequencies, namely a third a-frequency that is the inverse of the refresh period R3 and a third b-frequency that is the inverse of the refresh period R4, but each of the third a-frequency and the third b-frequency is a frequency lower than the first frequency that is the refresh rate of the pixel electrode 9a.

As described above, with the projection-type display apparatus 2000 including the liquid crystal apparatus 100 that is the electronic apparatus of this embodiment, the following effects can be achieved.

The projection-type display apparatus 2000 includes the laser light source 2001 that is a light source with an output light flux of 5000 lumen to 20000 lumen, the dichroic mirror 2012 that is a light splitting member that splits light from the laser light source 2001, the liquid crystal apparatus 100G that modulates first light G split by the dichroic mirror 2012, and the second liquid crystal apparatus 100B that modulates second light B split by the dichroic mirror 2012. The second liquid crystal apparatus 100B includes the pair of substrates 10 and 20 opposite to each other with the liquid crystal layer 50 therebetween, the pixel electrode 9a provided in the display region E of the pair of substrates 10 and 20 and configured to be supplied with an image signal at the first frequency, and the first electrode 108 of the liquid crystal apparatus 100B provided in the peripheral region F as a region outside the display region E and is alternately supplied with the positive polarity potential Va with a potential higher than the predetermined potential and the negative polarity potential Vb with a potential lower than the predetermined potential at the third frequency lower than the first frequency such that the positive polarity period T3 for setting the positive polarity potential Va and the negative polarity period T4 for setting the negative polarity potential have different lengths.

With this configuration, it is possible to provide an excellent projection-type display apparatus 2000 including the liquid crystal apparatuses 100G and 100B that can suppress generation of blemish in the display region E in the case where the laser light source 2001 that is a high-luminance light source with an output light flux of 5000 lumen to 20000 lumen is employed as the light source combined with the liquid crystal apparatus 100.

In the projection-type display apparatus 2000, the first light G is green light that is light in the wavelength range including the green wavelength band, and the second light B is blue light that is light in the wavelength range including the blue wavelength band. In this manner, with the driving pattern of the first electrode 108 that differs between the liquid crystal apparatus 100G and the liquid crystal apparatus 100B, an excellent projection-type display apparatus 2000 that can suppress generation of blemish in the display region E in the same manner for the liquid crystal apparatus 100G and the liquid crystal apparatus 100B can be provided.

In addition, the projection-type display apparatus 2000 includes the first light source with an output light flux of 5000 lumen to 20000 lumen, the second light source with an output light flux of 5000 lumen to 20000 lumen, the liquid crystal apparatus 100G that modulates the first light G from the first light source, and the second liquid crystal apparatus 100B that modulates the second light B from the second light source. The second liquid crystal apparatus 100B includes the pair of substrates 10 and 20 opposite to each other with the liquid crystal layer 50 therebetween, the pixel electrode 9a provided in the display region E of the pair of substrates 10 and 20 and configured to be supplied with an image signal at the first frequency, and the first electrode 108 of the liquid crystal apparatus 100B provided in a region corresponding to the peripheral region F outside the display region E and alternately supplied with the positive polarity potential Va with a potential higher than the predetermined potential and the negative polarity potential Vb with a potential lower than the predetermined potential at the third frequency lower than the first frequency such that the positive polarity period T3 for setting the positive polarity potential Va and the negative polarity period T4 for setting the negative polarity potential Vb have different lengths.

With this configuration, it is possible to provide an excellent projection-type display apparatus 1000 including the liquid crystal apparatuses 100G and 100B that can suppress generation of blemish in the display region E in the case where the laser light source 1001 that is a high-luminance light source with an output light flux of 5000 lumen to 20000 lumen is employed as the light source combined with the liquid crystal apparatus 100.

In the projection-type display apparatus 2000, the first light G is green light that is light in the wavelength range including the green wavelength band, and the second light B is blue light that is light in the wavelength range including the blue wavelength band. In this manner, with the driving pattern of the first electrode 108 that differs between the liquid crystal apparatus 100G and the liquid crystal apparatus 100B, an excellent projection-type display apparatus 2000 that can suppress generation of blemish in the display region E in the same manner for the liquid crystal apparatus 100G and the liquid crystal apparatus 100B can be provided.

While the projection-type display apparatuses 1000 and 2000 are exemplified as the electronic apparatus in the above-mentioned embodiment, the electronic apparatus to which the liquid crystal apparatus 100 is applied is not limited to this. For example, it may be applied to electronic apparatuses such as a head-up display (HUD), a head mounted display (HMD), a personal computer, a digital camera, and a liquid crystal television.

In addition, while a transmission type liquid crystal apparatus is exemplified as the liquid crystal apparatuses 100 and 200 in the above-mentioned embodiment, the liquid crystal apparatuses 100 and 200 may be a reflection type liquid crystal apparatus or a liquid crystal on silicon (LCOS) type liquid crystal apparatus.

In addition, while the laser light sources 1001 and 2001 are exemplified as the high-luminance light source in the above-mentioned embodiment, a high-luminance light source such as an LED light source may also be employed as the high-luminance light source.

In addition, while each of the first alignment layer 18 and the second alignment layer 22 has a two-layer structure in the above-mentioned embodiment, each of them may have a configuration composed only of an oblique layer.

In addition, a micro lens that corresponds to the pixel electrode 9a in a one-to-one relationship may be provided between the substrate 20w and the opposing electrode 21 of the opposed substrate 20 in the above-mentioned embodiment.

In addition, a micro lens that corresponds to the pixel electrode 9a in a one-to-one relationship may be provided between the substrate 10w and the pixel electrode 9a of the element substrate in the above-mentioned embodiment.

In addition, while the case where the opposing electrode 21 is disposed on the opposed substrate 20 side is exemplified in the above-mentioned embodiment, the position where the opposing electrode 21 is disposed is not limited to this. For example, it may be disposed between the pixel electrode 9a and the substrate 10w.

What is claimed is:

1. An electronic apparatus comprising:
   a light source with an output light flux of 5000 lumen to 20000 lumen;
   a light splitting member configured to split light from the light source;
   a first liquid crystal apparatus configured to modulate first light split by the light splitting member; and
   a second liquid crystal apparatus configured to modulate second light split by the light splitting member, wherein
   the first liquid crystal apparatus includes:
   a first liquid crystal layer
   a first pixel electrode provided in a display region and configured to be supplied with an image signal at a first frequency; and
   a first electrode provided in a region outside the display region and configured to be alternately supplied with a positive polarity potential with a potential higher than a predetermined potential and a negative polarity potential with a potential lower than the predetermined potential at a second frequency lower than the first frequency such that a positive polarity period in which the positive polarity potential is supplied and a negative polarity period in which the negative polarity potential is supplied have a same length, and
   the second liquid crystal apparatus includes:
   a second liquid crystal layer;
   a second pixel electrode provided in a display region of the second liquid crystal apparatus and configured to be supplied with an image signal at the first frequency; and
   a second electrode provided in a region outside the display region and configured to be alternately supplied with a positive polarity potential with a potential higher than a predetermined potential and a negative polarity potential with a potential lower than the predetermined potential at a third frequency lower than the first frequency such that a positive polarity period in which the positive polarity potential is supplied and a negative polarity period in which the negative polarity potential is supplied have different lengths.

2. The electronic apparatus according to claim 1, wherein the first light is light of a wavelength band including a green wavelength band; and
the second light is light of a wavelength band including a blue wavelength band.

3. The electronic apparatus according to claim 1, wherein the second frequency is one ten-thousandth to one-hundredth of the first frequency.

4. The electronic apparatus according to claim 1, wherein the first liquid crystal apparatus includes a third electrode provided outside the first electrode of the first liquid crystal apparatus in a region outside the display region of the first liquid crystal apparatus and configured to be supplied with a DC signal.

5. The electronic apparatus according to claim 4, wherein the DC signal is a signal of a positive polarity with a potential higher than the predetermined potential.

6. An electronic apparatus comprising:
a first light source with an output light flux of 5000 lumen to 20000 lumen;
a second light source with an output light flux of 5000 lumen to 20000 lumen;
a first liquid crystal apparatus configured to modulate first light from the first light source; and
a second liquid crystal apparatus configured to modulate second light from the second light source, wherein
the first liquid crystal apparatus includes:
a first liquid crystal layer
a first pixel electrode provided in a display region and configured to be supplied with an image signal at a first frequency; and
a first electrode provided in a region outside the display region and configured to be alternately supplied with a positive polarity potential with a potential higher than a predetermined potential and a negative polarity potential with a potential lower than the predetermined potential at a second frequency lower than the first frequency such that a positive polarity period in which the positive polarity potential is supplied and a negative polarity period in which the negative polarity potential is supplied have a same length, and
the second liquid crystal apparatus includes:
a second liquid crystal layer;
a second pixel electrode provided in a display region of the second liquid crystal apparatus and configured to be supplied with an image signal at a first frequency; and
a second electrode provided in a region outside the display region and configured to be alternately supplied with a positive polarity potential with a potential higher than a predetermined potential and a negative polarity potential with a potential lower than the predetermined potential at a third frequency lower than the first frequency such that a positive polarity period in which the positive polarity potential is supplied and a negative polarity period in which the negative polarity potential is supplied have different lengths.

7. The electronic apparatus according to claim 6, wherein
the first light is light of a wavelength band including a green wavelength band; and
the second light is light of a wavelength band including a blue wavelength band.

8. The electronic apparatus according to claim 6, wherein the second frequency is one ten-thousandth to one-hundredth of the first frequency.

9. The electronic apparatus according to claim 6, wherein the first liquid crystal apparatus includes a third electrode provided outside the first electrode of the first liquid crystal apparatus in a region outside the display region of the first liquid crystal apparatus and configured to be supplied with a DC signal.

10. The electronic apparatus according to claim 9, wherein the DC signal is a signal of a positive polarity with a potential higher than the predetermined potential.

* * * * *